H. L. DOHERTY.
PROCESS OF HYDRATING LIME AND UTILIZING HEAT OF HYDRATION.
APPLICATION FILED APR. 20, 1911. RENEWED DEC. 24, 1912.
1,066,719.   Patented July 8, 1913.
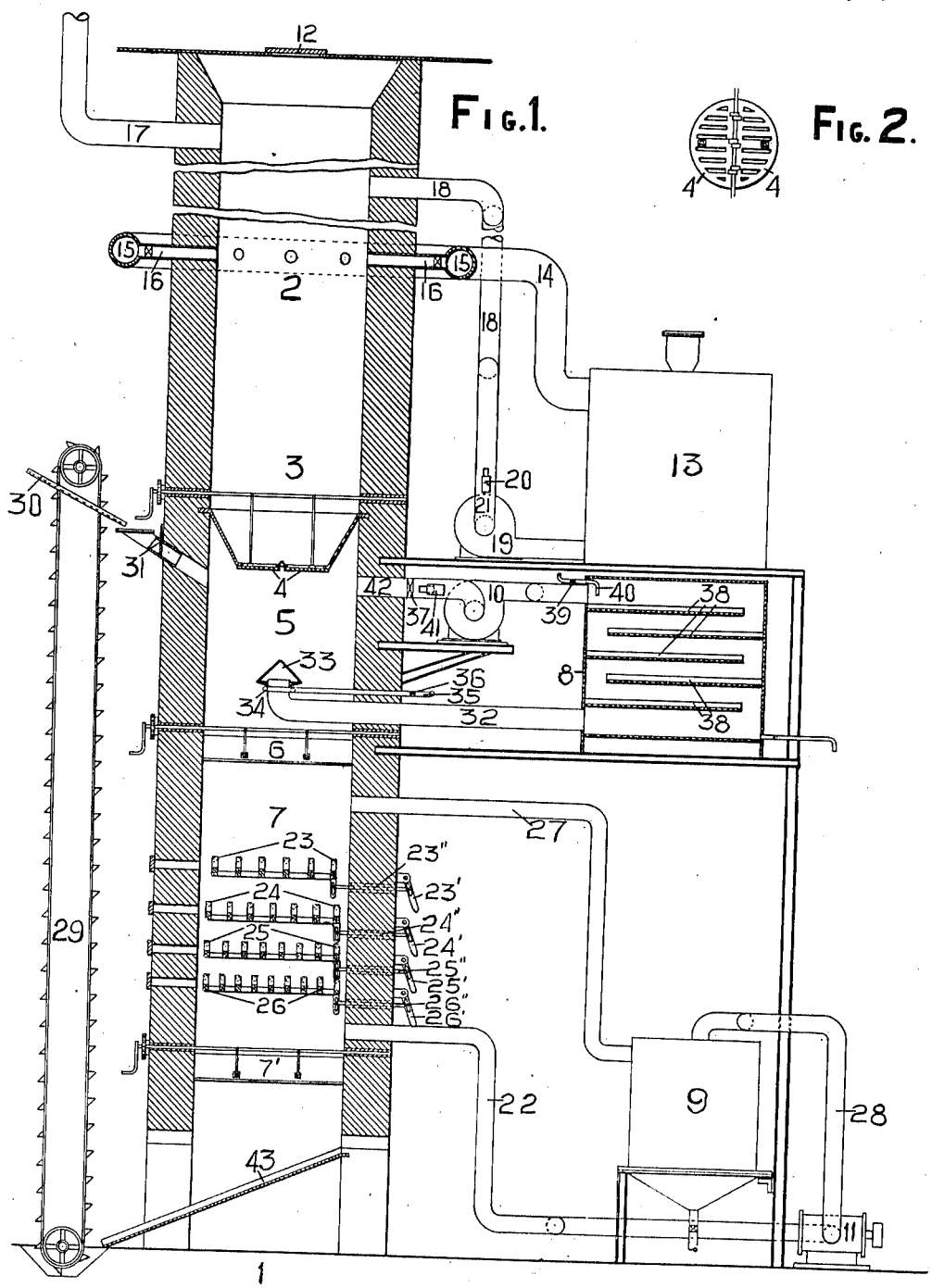
Witnesses:
Frank L. Blackburn
Thos. J. Carter
Henry L. Doherty, Inventor
By his Attorney Frank J. Young

UNITED STATES PATENT OFFICE.

HENRY L. DOHERTY, OF NEW YORK, N. Y.

PROCESS OF HYDRATING LIME AND UTILIZING HEAT OF HYDRATION.

1,066,719. Specification of Letters Patent. Patented July 8, 1913.

Application filed April 20, 1911, Serial No. 622,357. Renewed December 24, 1912. Serial No. 738,474.

*To all whom it may concern:*

Be it known that I, HENRY L. DOHERTY, a citizen of the United States, and a resident of New York city, in the county of New York and State of New York, have invented certain new and useful Improvements in Processes of Hydrating Lime and Utilizing Heat of Hydration, of which the following is a specification.

This invention relates to a process of hydrating lime and utilizing heat of hydration, and in particular to such a process in which the heat developed in the hydration of the lime is communicated to the air used in supporting the combustion in the kiln.

The object of my invention is to reduce the amount of fuel that is required in the burning of the lime by recuperating the heat developed in the hydration of the lime, as well as the manufacture of lime hydrate from limestone in what is substantially one operation. By my invention, I enter the limestone at the top of the kiln and withdraw the hydrated lime at the bottom.

In carrying out my invention, I introduce into the lime kiln, below the cooler of the same, two chambers—a hydrating chamber and a separating chamber. The lime after passing through the kiln enters the hydrating chamber where a current of air mixed with sufficient steam to hydrate the lime is passed through it. The air, heated by the heat developed by the reaction in the hydrating chamber, is divided into two currents. One current passes up through the kiln in contact with the hot lime in the cooler of the kiln, where it is further heated, and thence into the combustion zone of the kiln where it is used to burn the fuel. The other current of the air, which has been heated in the hydrator, is withdrawn by a suitable blower and forced together with fresh air through an evaporating chamber where it is contacted with water. The sensible heat of the air (which has been derived from the sensible heat of the lime and the heat liberated in the hydration) is, in part, given up to the water which is evaporated, the steam so formed mixing with the air. The steam laden air current is conducted into the hydrating chamber and passed through the lime therein where the steam is taken up by the lime, as before.

In the accompanying drawings, in which Figure 1 is a sectional view and Fig. 2 a detail view, I have shown a form of apparatus suitable for applying my invention.

1 is the lime-kiln, which has the shaft 2 in which the lime is burned, the lower part 3 of 2 being used as a cooler for the hot lime.

4 indicates the doors closing the bottom of the cooler 3.

5 is the hydrating chamber, 6 the doors closing the bottom of the same.

7 is the dust separator, closed by the doors 7'.

8 is the evaporating chamber, 9 the dust catcher for removing the finely divided hydrate taken up in 6 from the separator air.

10 is the blower which maintains the circulation through the hydrating and evaporating chambers, 11 the blower maintaining the circulation of air through the dust separator 7 and dust catcher 9.

In operating my invention, I may use any type of kiln preferred, but prefer to use a kiln of the type figured in which producer gas is burned. The limestone is charged into the kiln in the usual way in large lumps through the charging doors 12. The gas producer 13, having been brought up to the proper operating condition in the manner well known to those skilled in the art of producer operation, the gas from the producer passes through the connection 14 to the bustle-pipe 15, from which it is distributed through the passages 16 to the shaft of the kiln. Here it is burned by heated air that has passed through the hydrator 5 and the cooler 3, as described below. The gas is burned in contact with the partially calcined lime, completing the calcination of the same, the combustion gases thence passing up through the uncalcined stone, and the stone in various degrees of calcination, yielding up their heat to the same, finally discharging from the kiln through the stack 17. Part of the combustion gases are withdrawn from the kiln through the pipe 18 and diverted to the producer by the blower 19, together with air drawn into the blower through the damper 20 on the suction pipe 21. The proportion of combustion gas and air supplied to the gas producer is so regulated that the absorption of heat from the fuel bed of the producer through the reduction of the CO₂ and H₂O of the combustion gases by the respective reactions, $$(a)\ CO_2 + C = 2CO,$$

and $$(b)\ H_2O + C = H_2 + CO,$$

will just about balance the heat developed by the reaction, $$(c)\ C + O = CO,$$

of the oxygen of the air with the carbon of the fuel, in the manner described in my Letters Patent No. 938,987, dated Nov. 2nd, 1909, so that the temperature in the fuel bed is kept below the fluxing temperature of the ash of the fuel used therein. The hot burned lime descends through the cooler of the kiln, where the heated air from the hydrator is passed through it, and thence is discharged into the hydrator 5. The air-steam current enters the bottom of the hydrator 5 through the pipe 32, and passes up through the lime in the same, yielding up its water vapor to the lime to form hydrate of lime. As the lumps of quicklime take up the water vapor they gradually fall to pieces, the flour-like hydrate being removed from the exterior of the lumps by the mutual attrition which they exercise on each other as the mass is caused to pass downward through the hydrating chamber. The lime enters the hydrating chamber for the most part in large lumps. As these lumps pass downward through the hydrating chamber, they continually diminish in size; but I purposely regulate the rate at which I withdraw the material at the bottom of the hydrator, so that the larger lumps are only partially hydrated, or slaked. I thus leave a sufficient proportion of large fragments in the mass to maintain voids to keep the latter in a sufficiently open condition to permit of the ready passage of the draft current. At intervals, I withdraw from the bottom of the hydrator by opening the discharging doors 6, a portion of the partially hydrated mass. This falls through the pneumatic separator 7, through which an air current is forced by the blower 11. The mass of material charged into 7 from 5 consisting of fine hydrate and the unhydrated fragments is intercepted by the uppermost grate 23 of the hydrator. By shaking the bars of 23, through the operation of the lever 23′ and the connections 23″ to 23, the material is caused to gradually pass through 23 and falls on to the grate 24, and so on through the separator. The fine flour-like hydrate is winnowed out of the mass by the air current entering through 22 and is carried into the dust separator 7, through the pipe 27, where it is filtered out of the air current by bags or in any other suitable manner, according to the type of dust catcher used. The air, freed from its load of hydrate, again passes to the suction side of blower 11 through the pipe 28, discharging from the same through the pipe 22 to the separator 7, as before. The advantage in thus using the separator air in a closed circuit is that the hydrate is thus not exposed to the action of the CO₂ of the air. While the possible contamination of the hydrate due to using the untreated atmospheric air is not serious, still, I find some advantage in this method of using the separator air in a closed circuit. The unhydrated lumps and the particles too coarse to be capable of suspension in the air current are withdrawn from the dust separator 7 through the chute 18 by opening the discharge doors 7′ and raised by the elevator 29 to the chute 30, through which it passes, on opening the gate 31, back into the hydrator 5. Mixing with fresh quicklime from the cooler 3 this unhydrated material again passes through the hydrator where it is completely hydrated, the large lumps of the fresh charge of quicklime providing new material for keeping the charge open and permeable to the blast.

In starting operations, the water for the hydration is introduced in the form of steam into the air current passing through the pipes 32 and hood 33, through the perforated pipe 34 which encircles the air pipe 32. Steam is supplied to 34 through the pipe 35 by opening valve 36. The steam is carried by the air current into the mass in the hydrator and is taken up by the lime to form hydrate. The reaction $$CaO + H_2O = CaO_2H_2,$$

when the H₂O is supplied as steam, liberates about 969 B. T. U. (above 32° Fah.) per pound of CaO reacting. While it is true that, at first, some steam is condensed, the heat developed prevents any supersaturating of the lime with water. As the operation proceeds, the charge in 5 gradually builds up in temperature, raising the temperature of the air leaving the top of the hydrator. When the blower 10 is first started the valve 37 on the pipe 42 is closed and damper 41 opened. When the air discharging from the hydrator into the cooler of the kiln has been sufficiently heated, the damper 41 is partially closed and the valve 37 opened. Part of the hot air is now drawn off from the hydrator 5 through the pipe 42 and forced through the evaporator 8. Water is gradually turned on to the pans 38 by partially opening the valve 39 on the water supply pipe 40. The sensible heat of the air is communicated to the water in the pans 38 both by direct contact between the water and air and by heat conducted through the pans themselves from the hot air passing along their bottoms. The quantity of water admitted at this stage is restricted to the quantity which can be evaporated by the heat of the air circulated through 8, without reducing the temperature of the mixture below a temperature well above the boiling point. It is desirable that the temperature of the air-steam mixture leaving the evaporator should be well above the boiling point in order to insure that there will be no condensation of steam due to heat losses in the pipe 32 When the temperature of the portion of air drawn from the hydrator through the pipe 42 has reached a point such that its sensible heat above the temperature at which the air-steam mixture is introduced into the hydrator, is sufficient to evaporate the proportion of water required in the hydration, the valve 36 is closed and the valve 39 set so that the proper proportion of water is injected into the heated air current. As the temperature of the air leaving the hydrator rises, the proportion of air withdrawn through 42 is cut down. It is only necessary that the volume of air withdrawn through the pipe 42 should be sufficient to carry into the evaporator 8 the quantity of heat required to evaporate the water and leave the temperature of the mixed air-steam current leaving the evaporator above 212° Fah. As shown, the doors 4 closing the bottom of the cooler and supporting the charge in the kiln, are preferably of a grated construction or in the form of hinged grids. The air from the hydrator can thus pass freely up into the relatively hot lime in the cooler 3. The natural tendency of the air current is to pass directly into the cooler, and, in order to divert a portion of it to the evaporator, it is necessary that the suction exercised by the exhauster-blower 10 should be superior to the draft of the kiln.

It is to be noted that the heat which I withdraw from the hydrator 5 in the air taken off through 42 to evaporate the water for the hydration, is not lost to the calcining operation, since the latent heat of evaporation of the water is again liberated in the hydrating chamber when the water combines with the lime. The only heat which is lost to the calcination by my method of working is that due to condensation and radiation losses from the draft current passing through the system from the top to the bottom of the hydrator 5. The object in thus introducing the water into the hydrator 5 as steam, is that I thereby secure a more uniform hydration and automatically insure the production of a perfectly dry hydrate. Since the theoretical heat absorption in the dissociation of limestone per pound of lime produced is about 1400 B. T. U., and the theoretical heat development in the hydration of 1 lb. of lime is 485 B. T. U., it is seen, that the proportion of the heat of calcination which I return to the calcining operation by utilizing the heat developed in the hydration of the lime to heat the air used for supporting the combustion in the calcining operation is about one-third of the theoretical requirement.

Having described my invention, what I claim is:—

1. The method of recuperating the heat of hydration of lime in the burning of lime which comprises, continuously circulating air first in contact with hot lime, whereby said air is heated, second in contact with water to evaporate the same, whereby the said air is mixed with water vapor, and third circulating the mixture of air and water vapor in contact with quicklime, to hydrate said quicklime and to heat said air by the heat developed in said hydrating reaction, the said heat comprising the latent heat of evaporation of said water and the normal heat of hydration of said lime, and diverting from said circulating air current after it has been contacted with and heated by said hydrating lime the portion of the same required for sustaining the combustion of the fuel required for burning said lime.

2. The method of utilizing the heat of hydration of lime which consists in mixing water-vapor with air to be used in sustaining the combustion of fuel, passing the water-vapor laden air in contact with quicklime whereby the water-vapor of said air is absorbed by said quicklime to form hydrated lime and the said air heated, withdrawing a portion of said heated air and passing it in contact with water, whereby said water is evaporated by the heat of said portion of air, mixing the water-vapor laden air with another portion of air, and contacting the said mixture with quicklime.

3. The method of utilizing the heat of hydration of lime in the burning of lime which comprises, continuously circulating a current of air first in contact with hot lime, whereby said air is heated, second in contact with water to evaporate the same, whereby the said air is mixed with water vapor, and third circulating the mixture of air and water vapor in contact with quicklime to hydrate said quicklime by said water vapor and to heat said air by the heat developed in the hydration of said lime, said heat comprising the chemically developed heat of the hydrating reaction and the latent heat of said water vapor, diverting from said circulating air current after the same has been heated the portion of the same required for sustaining the combustion of the fuel necessary for burning said lime, and adding to the residual hot air of the circulating current before the same is contacted with water a weight of air substantially equal to the weight of the diverted air.

4. The process of utilizing the heat of hydration of lime which consists in hydrating lime by contacting the same with a current of air containing water-vapor, whereby the said lime is hydrated and the said air heated, contacting a portion of said heated air with water, whereby the said water is evaporated and the water-vapor formed mixed with said portion of air, adding fresh air to such mixture and passing the resulting mixture of air and water-vapor in contact with more quicklime whereby the said quicklime is hydrated and the said air heated.

5. The process of recuperating heat in the burning of lime which comprises, continuously circulating a current of air first in contact with heated lime, whereby said air is heated, second in contact with water to evaporate the same, whereby the said air is mixed with water vapor, and third circulating the mixture of air and water vapor in contact with quicklime to hydrate said quicklime by said water vapor and to heat said air by the heat developed in the hydration of said lime, said heat comprising the chemically developed heat of the hydrating reaction and the latent heat of said water vapor, diverting from said circulating air current after the same has been heated, the portion of air required for sustaining the combustion of the fuel necessary for burning said lime, passing said diverted air first in contact with the freshly burned lime to further heat said air and then into the region in which said lime is being burned, and adding to the residual hot air of the circulating current before the same is contacted with water a weight of air substantially equal to the weight of the diverted air.

6. The process of utilizing the heat of hydration of lime which consists in hydrating lime in a closed chamber by contacting the same with a current of air laden with water-vapor, whereby the said lime is hydrated and the said air heated, continuously withdrawing from said heated air current a volume of the same which will contain sufficient heat to vaporize the water required in the hydration of said lime, passing the said volume of heated air in contact with water, whereby the said water is vaporized and the said vapor mixed with said air, passing the said air-water-vapor mixture through the lime in said closed chamber together with the volume of air that is required to sustain the combustion in the kiln in which said lime is burned, whereby a further portion of the lime in said chamber is hydrated and the said air heated, and passing the necessary proportion of such heated air into the lime-kiln in which said lime is burned to sustain the combustion therein.

7. The process of utilizing the heat of hydration of lime which consists in burning the said lime in a kiln with preheated air, charging the said lime into a hydrating chamber, hydrating the said lime in said chamber by continuously passing therethrough a current of air loaded with water-vapor, whereby the said lime is hydrated and the said air current heated, the said water-vapor being generated by continuously diverting a volume of such heated air containing sufficient heat to generate the said water-vapor through a closed chamber in which it is contacted with the proper proportion of water, whereby the said water is vaporized, passing the water-vapor-laden air together with the air for sustaining the combustion in said kiln through the lime in said hydrating chamber, whereby a further portion of said lime is hydrated and said air heated, and passing the heated combustion air into said kiln to sustain the combustion therein.

8. In the manufacture of hydrated lime, the process which comprises, passing air in contact with hydrated lime to heat said air, passing said heated air in contact with water to evaporate water by heat developed in the hydration of said lime and to form a mixture of air and water vapor, transmitting quicklime through a hydrating region, transmitting said mixture of air and water vapor through said region, whereby the said lime is hydrated by water vapor formed by heat developed in the hydrating reaction.

9. In the manufacture of hydrated lime, the process which comprises, transmitting quicklime through a hydrating chamber, continuously circulating a gaseous medium which is substantially non-reactive with quicklime in a closed circuit through said hydrating chamber and an evaporating chamber, said evaporating chamber containing water, whereby said gaseous medium is caused to take up heat developed in the hydration of said quicklime to transfer said heat to the water in said evaporating chamber to evaporate said water and to form an admixture of water vapor with said gaseous medium, and to transport the so-formed water vapor into contact with said quicklime, whereby the said quicklime is subjected to hydration by water vapor diffused through a body of diluent gas.

Signed at New York city in the county of New York and State of New York this 19th day of April A. D. 1911.

HENRY L. DOHERTY.

Witnesses:
 FRANK L. BLACKBURN,
 THOS. I. CARTER.